(12) United States Patent
Francescutto et al.

(10) Patent No.: US 9,660,697 B2
(45) Date of Patent: May 23, 2017

(54) ELECTRICAL INSTALLATION WITH IMPROVED GATEWAY MODULE

(71) Applicant: BELENOS CLEAN POWER HOLDING AG, Bienne (CH)

(72) Inventors: Gianni Francescutto, Bienne (CH); Mariano Fasano, Cornol (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 14/785,893

(22) PCT Filed: Jun. 13, 2014

(86) PCT No.: PCT/EP2014/062440
§ 371 (c)(1),
(2) Date: Oct. 21, 2015

(87) PCT Pub. No.: WO2014/198932
PCT Pub. Date: Dec. 18, 2014

(65) Prior Publication Data
US 2016/0072552 A1    Mar. 10, 2016

(30) Foreign Application Priority Data

Jun. 14, 2013  (EP) ..................................... 13172061

(51) Int. Cl.
*H04B 3/56*     (2006.01)
*H04B 3/54*     (2006.01)

(52) U.S. Cl.
CPC ............... *H04B 3/56* (2013.01); *H04B 3/54* (2013.01); *H04B 2203/5416* (2013.01);
(Continued)

(58) Field of Classification Search
CPC .... H04B 3/54; H04B 3/56; H04B 2203/5416; H04B 2203/5445; H04B 2203/5466; H04B 2203/5483
See application file for complete search history.

(56) References Cited

U.S. PATENT DOCUMENTS

2011/0031814 A1* 2/2011 Giesler ............... H02J 13/0082
307/77
2011/0121648 A1* 5/2011 Pan ........................... H02J 3/14
307/26

(Continued)

OTHER PUBLICATIONS

Kosuke Kurokawa, et al., "Conceptual considerations on PV systems composed of AC modules" Solar Energy Materials and Solar Cells, vol. 47, No. 1-4, XP004099644, Oct. 1, 1997, pp. 243-250.

(Continued)

*Primary Examiner* — Freshteh N Aghdam
(74) *Attorney, Agent, or Firm* — Oblon, McClelland, Maier & Neustadt, L.L.P.

(57) ABSTRACT

A gateway module for an electrical power grid, the gateway module configured to receive a power signal including a modulated component for conveying information from an electrical module producing electricity, and to process the power signal to provide a compatible signal to the electrical power grid. The gateway module includes a main unit including a control circuit controlling an interface to manage information from the modulated component of the power signal and a filtering circuit for filtering the modulated component.

13 Claims, 4 Drawing Sheets

(52) U.S. Cl.
CPC ............... *H04B 2203/5445* (2013.01); *H04B 2203/5466* (2013.01); *H04B 2203/5483* (2013.01)

(56) References Cited

U.S. PATENT DOCUMENTS

2014/0097684 A1* 4/2014 Totani ................. H02J 3/381
                                                       307/29
2014/0265579 A1* 9/2014 Mumtaz ............... H02M 7/42
                                                       307/43

OTHER PUBLICATIONS

Eduardo Roman, et al., "Intelligent PV Module for Grid-Connected PV Systems" IEEE Transactions on Industrial Electronics, vol. 53, No. 4, XP055087344, Aug. 2006, pp. 1066-1073.
International Search Report issued on Aug. 20, 2014 for PCT/EP2014/062440 filed on Jun. 13, 2014.

* cited by examiner

ELECTRICAL INSTALLATION WITH IMPROVED GATEWAY MODULE

CROSS-REFERENCE TO RELATED APPLICATIONS

This is a National phase Application in the United States of International Patent Application PCT/EP2014/062440 filed Jun. 13, 2014 which claims priority on European patent Application 13172061.7 filed Jun. 14, 2013. The entire disclosures of the above patent applications are hereby incorporated by reference.

The present invention concerns a gateway module for an electrical power grid, or installation. The gateway module is capable of receiving a power signal comprising a modulated component to convey information from an electrical module producing electricity and capable of processing the power signal to provide said electrical power grid with a compatible signal, said gateway module comprising a main unit including a control circuit controlling a read circuit for reading the modulated component information and a filtering circuit for filtering this modulated component to provide a compatible signal to the electrical power grid.

BACKGROUND OF THE INVENTION

The present invention concerns the field of electrical installations for a domestic grid and in particular electrical installations using renewable energy.

Such an installation 1, visible in FIG. 1, generally includes a domestic grid connected to the mains electrical power grid and to systems 2 generating electricity from renewable energy such as wind turbines or solar panels. These systems may include a solar module or a wind turbine module. These systems generating electricity from renewable energy are provided with one or more micro-inverters so as to supply an output signal compatible with the domestic grid. This signal S1 is sent to a gateway unit 3. This system S1 includes a modulated component permitting the exchange of information between the systems generating electricity from renewable energy and the gateway unit.

This gateway unit 3 is used to read the information from the modulated component and then filter it so that any imperfections are removed from the output signal before it is injected into the domestic grid. This unit therefore includes a filter 6, a read circuit 5 and a control circuit 4 for controlling the entire unit.

In the prior art, where systems generating electricity from renewable energy include a plurality of modules, then each module provides a power signal S1, S2, S3 and is associated with a gateway unit 3.

The drawback of this configuration is that it requires one gateway unit per module. Since each gateway unit includes a filter 6, a read circuit 5 and a control circuit 4, multiplying the number of modules and thus the number of gateway units leads to higher costs.

Further, there are known, from the article by E. Roman et al: »Intelligent PV module for Grid-Connected PV systems», IEEE TRANSACTIONS ON INDUSTRIAL ELECTRONICS, vol. 53, no 4, Jan. 6, 2006, systems including a plurality of solar modules, with each solar module including a solar panel. Each solar panel is associated with a DC-DC converter having the function of detecting the maximum power point tracking point or "MPPT". The entire assembly is then connected to a DC-AC converter to power an electrical power grid.

These solar panels are connected to a control circuit which retrieves information from the panels.

However, these systems are devised for single phase grids and, when applied to multiphase grids, they require one gateway unit for each additional phase.

There is also known from US Patent No 2011/0031814 a system including several photovoltaic panels, the photovoltaic panels are arranged in groups and connected to an inverter circuit via a junction box. This junction box makes it possible to provide information from the solar panels. The objective here is to have only one gateway unit for all the photovoltaic panels, application to a multi-phase grid does not appear to be intended.

The document by Kurokawa K et al: «Conceptual considerations on PV systems composed of AC modules», Solar energy materials and solar cells, Elsevier Science Publishers, Amsterdam, NL, is a document describing photovoltaic systems including AC modules, one such AC module being defined as including one photovoltaic module and one inverter.

However, the systems described in the above document do not describe the presence of a gateway module and cannot therefore be used for the applications of the present invention.

SUMMARY OF THE INVENTION

It is an object of the invention to provide a gateway module for an electrical power grid which is less expensive, modular and more compact.

To this end, the invention concerns a gateway module for an electrical installation, said gateway module being capable of receiving an electrical signal, a power signal through a phase line and a neutral line, said power signal including a modulated component for conveying information from said electrical module producing electricity, and capable of processing the power signal to provide a compatible signal to an electrical power grid, said gateway module including a main unit comprising a control circuit controlling interface means to manage information of the modulated component of the power signal and a filtering circuit for filtering the modulated component and making the power signal compatible with the grid, characterized in that said gateway module further includes at least one secondary unit provided with a filtering circuit for filtering the power signal provided by the phase line and the neutral line of an additional electrical module and arranged so that the interface means can manage information of the modulated component of the power signal provided by the additional electrical module, said at least one secondary unit being controlled by the control circuit of the main unit.

This configuration has the advantage of allowing easy control of a single phase grid and a three-phase grid while drastically reducing costs and providing a more compact gateway module.

In a first advantageous embodiment, each secondary unit processes the power signal from an additional electrical module, each secondary unit being controlled by the control circuit of the main unit.

In a second advantageous embodiment, the electrical module is composed of at least one element supplying electricity.

In a third advantageous embodiment, each electrical module further includes at least one micro-inverter for providing the power signal.

In another advantageous embodiment, the interface means include one communication circuit in the main unit and one communication unit per secondary unit.

In another advantageous embodiment, the interface means include passive coupling elements for forming the connection between the control circuit and at least the phase line and the neutral line of an electrical module connected to the main unit or to a secondary unit.

In another advantageous embodiment, the interface means include passive inductive coupling elements or passive capacitive coupling elements or a combination of passive inductive coupling elements and passive capacitive coupling elements.

In an advantageous embodiment, the interface means include a plurality of inductive coupling elements each including a primary coil coupled by induction to a first secondary coil electrically connected to the phase line and to the neutral line of an electrical module, and to a second secondary coil, the primary coil being connected to the second primary coil of the main unit or of the preceding secondary unit whereas the second secondary coil is connected to the primary coil of the following secondary unit, the inductive coupling element being arranged so that the primary coil is connected to the control unit.

In an advantageous embodiment, the interface means include a plurality of capacitive coupling elements arranged in each secondary unit, each capacitive coupling element including a first capacitor, connected between a first connection terminal and the phase line of the additional electrical module connected to said secondary unit, and a second capacitor, connected between a second connection terminal and the neutral line of the additional electrical module, the first connection terminals of the secondary units being connected to each other and connected to the phase line of the electrical module connected to the main unit, the second connection terminals of the secondary units being connected to each other and connected to the neutral line of the electrical module connected to the main unit, the control circuit including a phase coupler, connected by a first of its terminals to the first connection terminals of the secondary units, and by a second of its terminals to the second connection terminals of the secondary units.

In an advantageous embodiment, at the output of the main unit and of the secondary units, the filtered phases of the electrical modules are interconnected so as to create a three-phase signal for the electrical power grid.

In an advantageous embodiment, each secondary unit is electrically connected to the main unit.

In an advantageous embodiment, the electrical module is a solar module and each element supplying electricity is a solar panel.

In an advantageous embodiment, the electrical module is a wind turbine module and each element supplying electricity is a wind turbine.

BRIEF DESCRIPTION OF THE DRAWINGS

The objects, advantages and features of the gateway module for an installation according to the present invention will appear more clearly in the following detailed description of at least one embodiment of the invention, given solely by way of non-limiting example and illustrated by the annexed drawings, in which.

DETAILED DESCRIPTION OF THE INVENTION

The present invention proceeds from the general inventive idea that consists in having an electrical power grid powered by electrical modules, the entire system being managed by a modular gateway module which is cheap and more compact.

Figure 1:
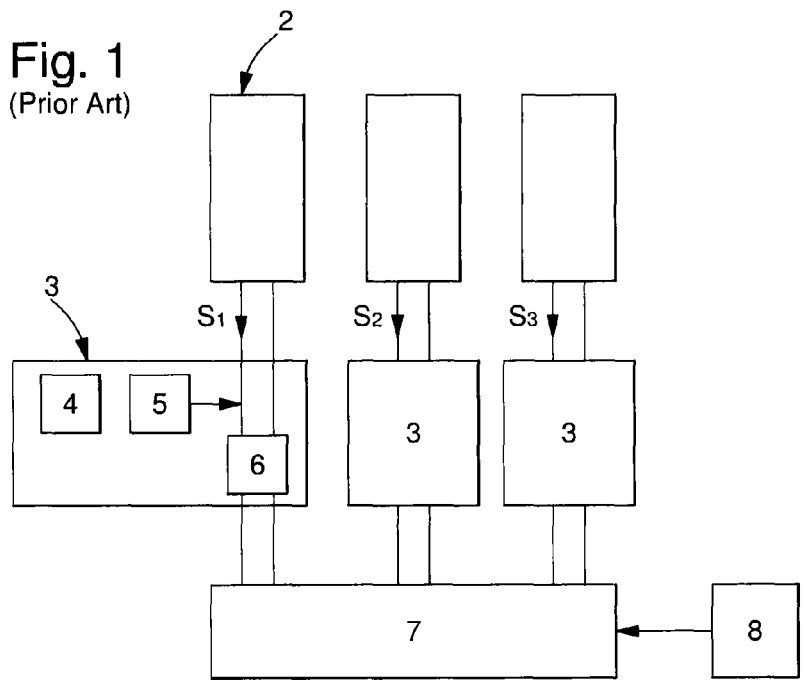
FIG. 1 shows a schematic view of an installation with a gateway module according to the prior art.
Figure 2:
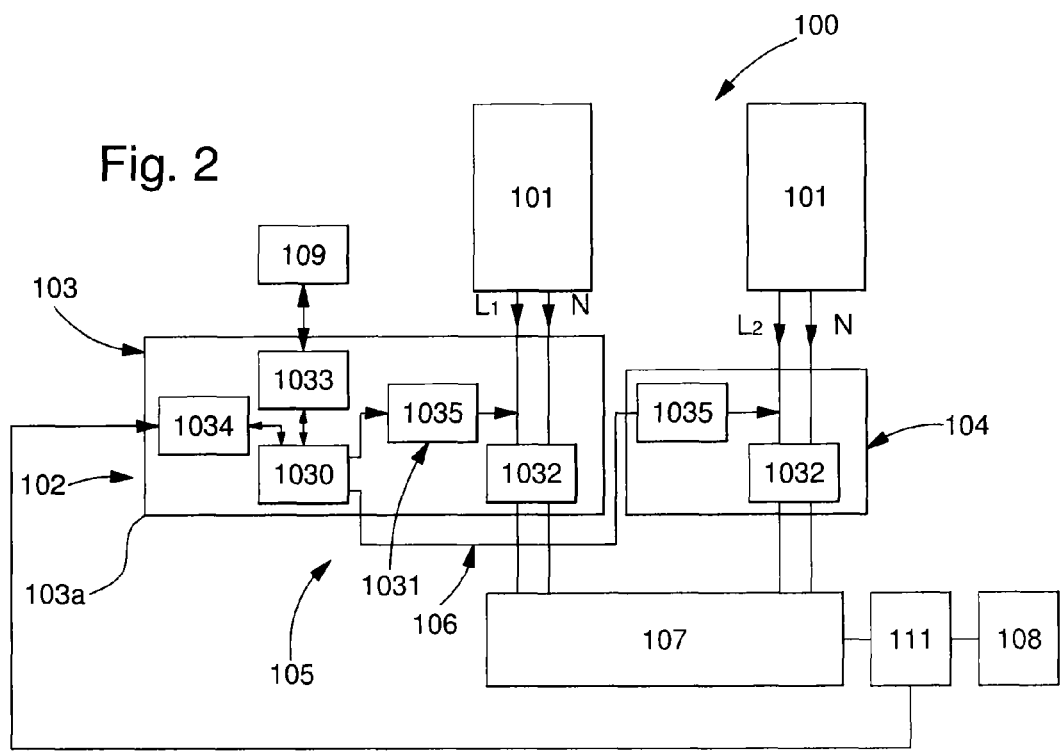
FIG. 2 shows a schematic view of a first embodiment of the installation with a gateway module according to the invention.

FIG. 2 shows an installation 100. This installation 100 includes an electrical power grid such as a domestic grid 107. This domestic grid 107 is first of all connected to the mains electrical power grid 108. This domestic grid 107 is also connected to at least one electrical module 101. Electrical module 101 is an electricity generating module, such as, for example a solar or wind turbine or electrochemical or hydroelectric module. Electrical module 101 is composed of at least one element 101b supplying electrical energy. For example, if the electrical module is a solar module, it will be assumed that the element supplying electrical energy is a solar panel, each solar panel being formed of a multitude of photovoltaic cells. Of course, it is possible to envisage an electrical module 101 including several solar panels or wind turbines mounted in parallel, this depends on the power handling capacity of electrical module 101.

Each electrical module 101 further includes one or more micro-inverters 101a, each micro-inverter 101a being associated with an electrical power supply element 101b. Micro-inverter 101a is used to make the signal provided by electrical power supply element 101b compatible. This micro-inverter 101a is used to provide a power signal Si at the output of electrical module 101 through a phase line Li and a neutral line N. This power signal Si includes a modulated component. This component is frequency modulated in accordance with power line communication technology. The modulated component is then used to convey information.

In fact, installation 100 also includes a gateway module 102. Gateway module 103 is a module used to adapt power signal Si and its modulated component to the domestic grid.

To achieve this, gateway module 102 includes a first gateway unit or main unit 103. This main unit 103 includes a control circuit 1030 which controls interface means 1031 to manage information from the modulated component and a filtering circuit 1032 for filtering the modulated component so as to provide the electrical power grid with a compatible, filtered signal. Main unit 103 further includes a data transmission circuit 1033 using, for example, the Ethernet format, and which is used for harvesting information or remote diagnostics. Data transmission circuit 1033 communicates, for example, with a portable device 109, such as a tablet or telephone which acts as a remote controller. Main unit 103 also includes an interface circuit 1034 for information read-out to which is connected an energy counter 111 disposed between domestic grid 107 and the mains power grid 108 to determine the current home power consumption, i.e. the power consumed by domestic grid 107. This makes it possible to regulate the power produced by electrical modules 101.

The transmitted information is divided into two information types: the information sent from electrical module 101 to main unit 103 of gateway module 102, and the information received by electrical module 101 from main unit 103 of gateway module 102.

The information sent from electrical module 101 to main unit 103 is information concerning, for example, the state of the photovoltaic cells so that if one or more cells become less effective, information will be sent to gateway module 103 or a data report will be generated and made available in module 101. Conversely, the information received by electrical module 101 from the main unit of gateway module 103 is configuration or control type information. Indeed, pursuant to information from electrical module 101 either through programming or pursuant to external information such as the weather, control circuit 1030 can send control information to electrical module 101. This information may lead to certain cells being cut off or a decline in their performance. An information example is the output power set point of module 101.

Figure 3:
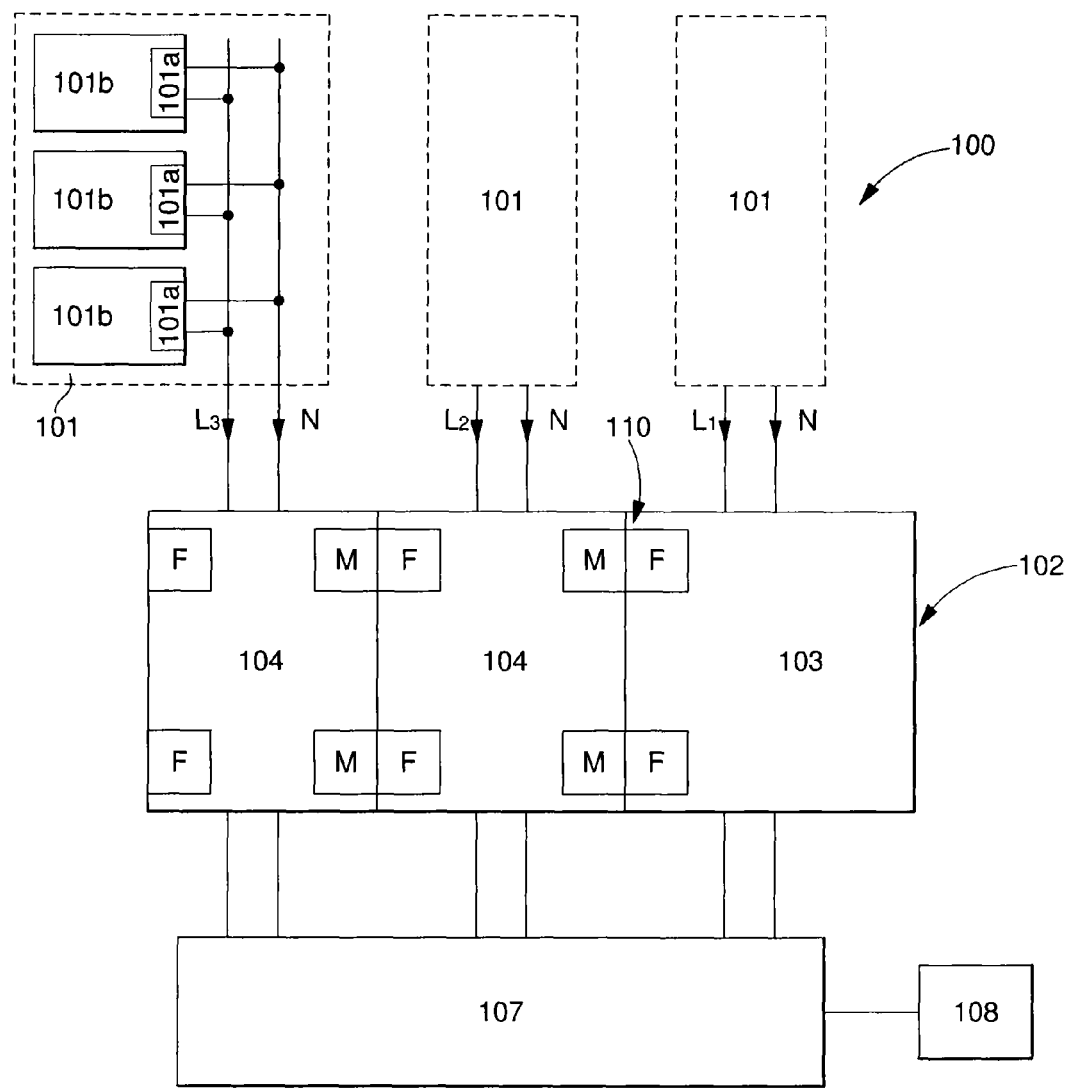
FIG. 3 shows a schematic view of a particular arrangement of the installation with a gateway module according to the invention.

Advantageously, when installation 100 includes other electrical modules 101, the present invention provides for gateway module 102 to include secondary units 104. Indeed, main unit 103 is arranged to be connected to a single electrical module 101 providing a power signal S1 carried by phase line $L_1$. However, some installations require more power. As such, these installations may operate with a three-phase grid. Such a grid then has a plurality of phases. It is possible to envisage using several electrical modules 101 to power domestic grid 107. These other electrical modules provide a power signal Si carried by phase line Li, for example second electrical module 101 provides a power signal S2 carried by phase line $L_2$, while a third electrical module 101 provides a power signal S3 carried by phase line $L_3$, as seen in FIG. 3. These phase lines $L_2$ and $L_3$ are thus used to form the three-phase grid by sharing the neutral lines of each of the three units.

These secondary units 104 of gateway module 102 are each connected to an electrical module 101, i.e. secondary unit 104 receives the power signal from only one electrical module 101. Each of these secondary units 104 is arranged so that interface means 1031 is concerned with one phase line Li and can read the information from the modulated component of power signal Si from the associated electrical module 101. These secondary units 104 include a filtering circuit 1032 for filtering the modulated component of the power signal from the associated electrical module 101. Thus, if installation 100 includes three electrical modules 101, gateway module 102 includes a main unit 103 and two secondary units 104. Secondary units 104 do not have data transmission circuits 1033 or information read-out interface circuits 1034.

It is therefore noted that these secondary units 104 are not provided with a control circuit 1030. Indeed, advantageously according to the invention, secondary units 104 are controlled by control unit 1030 of main unit 103. This control unit 1030 of main unit 103 controls interface means 1031 and filtering circuit 1032 of each secondary unit 104.

This configuration has the advantage of allowing easy control of a single phase grid and of a three-phase grid while drastically the reducing costs and complexity of installation 100 and providing a more compact gateway module 102. Indeed, the gateway module 102 according to the present invention includes only one main unit 103 for a plurality of electrical modules 101, so that there is only one control circuit 1030 per gateway module 102. Further, this configuration having only one unit with one control unit 1030, which controls all the units, makes it possible to obtain more compact secondary units 104.

At the output of main unit 103 and of secondary units 104, the signals are connected to form, from the phases of each electrical module 101, the three-phase signal of the three-phase system for the domestic and/or mains power grid.

The invention thus makes it possible to manage one or more single phase grids or a three-phase grid or to manage a three-phase grid and one or more single phase grids.

In a first embodiment seen in FIG. 3, interface means 1031 include one communication circuit 1035 per main unit 103 or secondary unit 104. This means that main unit 103 includes one communication circuit 1035 and that each secondary unit 104 also includes one communication circuit 1035. These communication circuits 1035 send their information to the control circuit 1030 of main unit 103. Each communication circuit 1035 includes a transformer, i.e. a primary coil and a secondary coil, the primary coil being connected to a control element while the secondary coil is connected to phase line Li and to neutral line N.

In a second embodiment, interface means 1031 use passive coupling and notably passive coupling elements 1031a.

Figure 4:
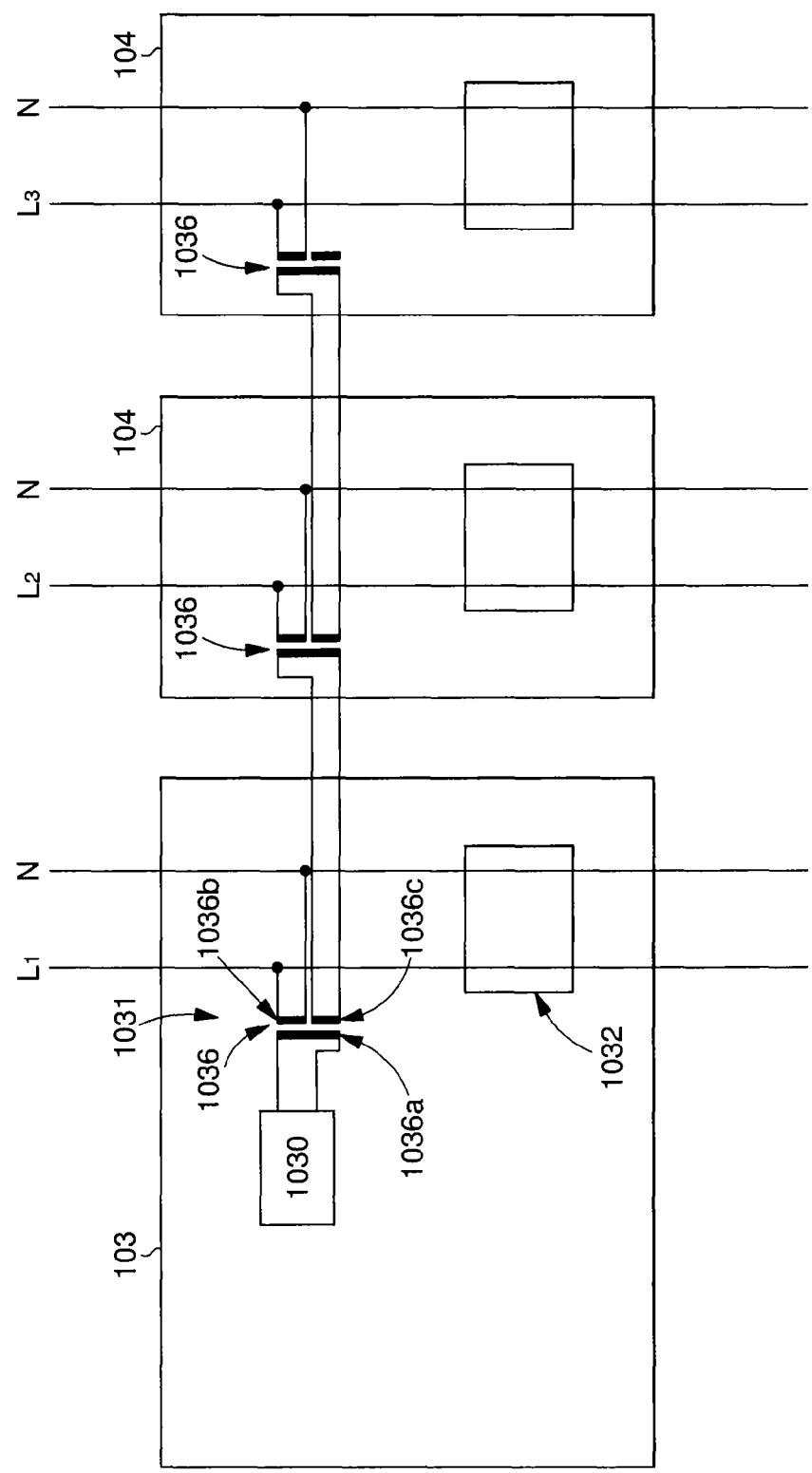
FIG. 4 shows a schematic view of a first variant of a second embodiment of the installation with a gateway module according to the invention.

In a first variant visible in FIG. 4, the passive coupling is inductive. In main unit 103, control circuit 1030 is connected to a first inductive coupling element 1036. This first inductive coupling element includes a primary coil 1036a provided with two contact terminals and coupled by induction to a first secondary coil 1036b and a second secondary coil 1036c. The first secondary coil 1036b is provided with two contact terminals for electrical connection to phase line $L_1$ and to neutral line N. The second secondary coil 1036c is provided with two contact terminals for electrical connection to a second inductive coupling element 1036 located in a first secondary unit 104.

This second inductive coupling element 1036 of the first secondary unit 104 includes a primary coil 1036a connected to the second secondary coil 1036c of the first inductive coupling element 1036. The second inductive coupling element 1036 of the first secondary unit 104 further includes a first secondary coil 1036b and a second secondary coil 1036c coupled by induction to primary coil 1036a.

Each secondary unit 104 is thus provided with an inductive coupling element 1036 which includes a primary coil 1036a coupled by induction to a first secondary coil 1036b and a second secondary coil 1036c, the primary coil 1036a being connected to the second primary coil 1036c of main unit 103 or the preceding secondary unit 104, while the second secondary coil 1036c is connected to the primary coil 1036 of the following secondary unit 104.

This passive coupling variant makes it possible to limit costs and to obtain compact secondary units 104 since there is only control circuit 1030 of main unit 103 to control the various inductive coupling elements 1036.

Figure 5:
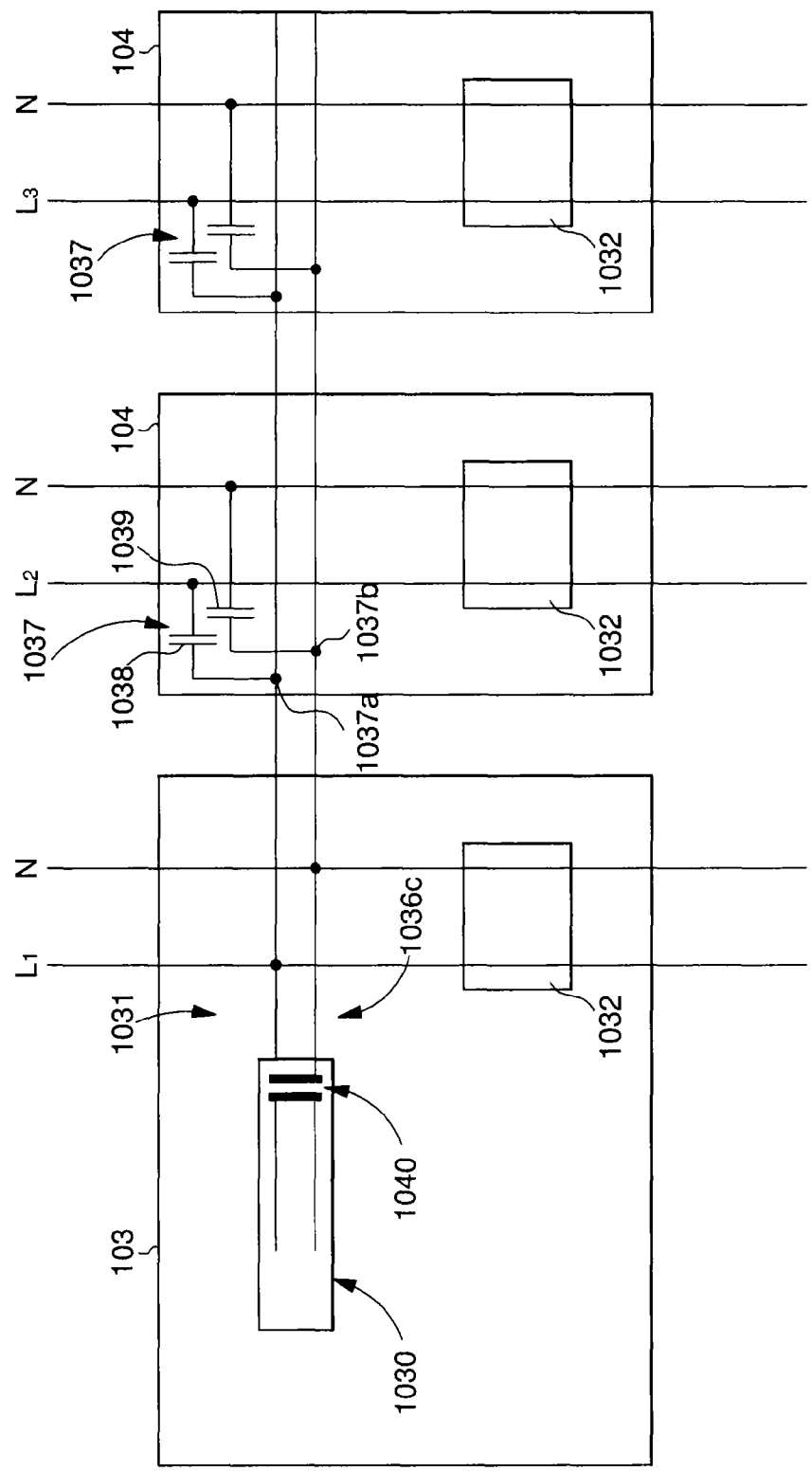
FIG. 5 shows a schematic view of a second variant of a second embodiment of the installation with a gateway module according to the invention.

In a second variant visible in FIG. 5, the passive coupling is inductive. In main unit 103, control circuit 1030 is electrically connected to phase line $L_1$ and to neutral line N of the electrical module 101 connected to main unit 103.

The secondary units 104 each include a capacitive coupling element 1037. This capacitive coupling element 1037 includes a first capacitor 1038, connected between a first connection terminal 1037a and phase line Li, and a second capacitor 1039, connected between a second connection terminal 1037b and neutral line N. The entire assembly is arranged so that the first connection terminals 1037a of secondary units 104 are connected to each other and connected to phase line $L_1$ of main unit 103, and so that the second connection terminals 1037b of secondary units 104 are connected to each other and connected to neutral line N of main unit 103.

To achieve coupling between the different phases, control circuit 1030 includes a phase coupler 1040 formed of a transformer, i.e. of a primary coil and a secondary coil interacting with each other.

In order for the control unit of main unit 103 to communicate and control secondary units 104, it is provided that communication means 105 are arranged between the main unit and the secondary units.

In a first example, communication means 105 includes wireless communication means such as a wifi system or a Bluetooth® or WiMax system. These wireless communication systems make it possible for secondary units 104 and main unit 103 to be are arranged in different parts if required by installation 100. Further, these wireless communication means can be used to send information to a control terminal for the user. The user can then remotely control or monitor the system.

In a second example, communication means 105 include wired or physical communication means 106, i.e. there is a physical connection between main unit 103 and secondary units 104. This solution makes it possible to achieve improved compactness of secondary units 104 since it does not require specific circuits for wireless communication which have to be powered.

Ingeniously, according to the invention, main unit 103 and secondary units 104 may be arranged to nest inside each other. To achieve this, the units are integrated in a case 103a. This case, which is preferably made of plastic, is parallelepiped advantageously enabling the various cases to be fitted to each other edge-to-edge, as seen in FIG. 3. This arrangement makes it possible to provide said cases with a snap-fit system 110. This snap-fit system 110 is produced to fulfil two functions. The first function is to secure the cases to each other, while the second function is to ensure an electrical connection. For this purpose, snap-fit system 110 includes at least one male element (M) and at least one female element (F) each situated on one edge of a unit. In a particular example, the snap-fit system includes two male elements (M) and two female elements (F) to improve the attachment of two units to each other as visible in FIG. 3.

It will be clear that various alterations and/or improvements and/or combinations evident to those skilled in the art may be made to the various embodiments of the invention set out above without departing from the scope of the invention defined by the annexed claims.

The invention claimed is:

1. A gateway module for an electrical installation, the gateway module configured to receive, from an electrical module, a power signal through a phase line and a neutral line, the power signal including a modulated component for conveying information from the electrical module producing electricity, and configured to process the power signal to provide a compatible signal to an electrical power grid, the gateway module comprising:
a main unit comprising a control circuit controlling interface means to manage information from the modulated component of the power signal and a first filtering circuit for filtering the modulated component and making the power signal compatible with the grid;
at least one secondary unit including a second filtering circuit for filtering the power signal provided by the phase line and the neutral line of an additional electrical module and configured so that the interface means manages information from the modulated component of the power signal provided by the additional electrical module, the at least one secondary unit being controlled by the control circuit of the main unit,
wherein the interface means includes passive coupling elements for forming connection between the control circuit and at least the phase line and the neutral line of the electrical module connected to the main unit or to the secondary unit, and
wherein the interface means includes a plurality of inductive coupling elements each including a primary coil coupled by induction to a first secondary coil electrically connected to the phase line and to the neutral line of an electrical module, and to a second secondary coil, the primary coil being connected to the second primary coil of the main unit or of a preceding secondary unit whereas the second secondary coil is connected to the primary coil of the following secondary unit, the inductive coupling element configured so that the primary coil is connected to the control circuit.

2. The gateway module according to claim 1, wherein each secondary unit processes the power signal of an additional electrical module, each secondary unit being controlled by the control circuit of the main unit.

3. The gateway module according to claim 2, wherein the electrical includes at least one element supplying electricity.

4. The gateway module according to claim 1, wherein the electrical module includes at least one element supplying electricity.

5. The gateway module according to claim 4, wherein each of the electrical modules further includes at least micro-inverter for providing the power signal.

6. The gateway module according to claim 3, wherein each of the electrical modules further includes at least one micro-inverter for providing the power signal.

7. The gateway module according to claim 1, wherein the interface means includes one communication circuit in the main unit and one communication circuit per secondary unit.

8. The gateway module according to claim 1, wherein, at an output of the main unit and of the secondary unit, filtered phases of the electrical modules are interconnected to create a three-phase signal for the electrical power grid.

9. The gateway module according to claim 1, wherein the at least one secondary unit is connected to the main unit by a wired communication means.

10. The gateway module according to claim 1, wherein the electrical module is a solar module, each element supplying electricity being a solar panel.

11. The gateway module according to claim 1, wherein the electrical module is a wind turbine module, each element supplying electricity being a turbine panel.

12. A gateway module for an electrical installation, the gateway module configured to receive, from an electrical module, a power signal through a phase line and a neutral line, the power signal including a modulated component for conveying information from the electrical module producing electricity, and configured to process the power signal to provide a compatible signal to an electrical power grid, the gateway module comprising:
a main unit comprising a control circuit controlling interface means to manage information from the modulated component of the power signal and a first filtering circuit for filtering the modulated component and making the power signal compatible with the grid;

at least one secondary unit including a second filtering circuit for filtering the power signal provided by the phase line and the neutral line of an additional electrical module and configured so that the interface means manages information from the modulated component of the power signal provided by the additional electrical module, the at least one secondary unit being controlled by the control circuit of the main unit, wherein the interface means includes passive coupling elements for forming connection between the control circuit and at least the phase line and the neutral line of the electrical module connected to the main unit or to the at least one secondary unit, and wherein the interface means includes a plurality of capacitive coupling elements arranged in the at least one secondary unit, each capacitive coupling element including a first capacitor, connected between a first connection terminal and the phase line of the additional electrical module connected to the at least one secondary unit, and a second capacitor, connected between a second connection terminal and the neutral line of the additional electrical module, the first connection terminals of the at least one secondary unit being connected to each other and connected to the phase line of the electrical module connected to the main unit, the second connection terminals of the at least one secondary unit being connected to each other and connected to the neutral line of the electrical module connected to the main unit, the control circuit including a phase coupler, connected by a first terminal to the first connection terminals of the at least one secondary unit, and by a second terminal to the second connection terminals of the at least one secondary unit.

13. The gateway module according to claim 12, wherein the at least one secondary unit is connected to the main unit by a wired communication means.

\* \* \* \* \*